(12) United States Patent
Ross, Jr.

(10) Patent No.: US 6,463,762 B1
(45) Date of Patent: Oct. 15, 2002

(54) PROCESS AND APPARATUS FOR BREAKING AND TRANSPORTING FLAT GLASS SHEETS

(75) Inventor: Edward Joseph Ross, Jr., Mars, PA (US)

(73) Assignee: Billco Manufacturing, Inc., Zelienople, PA (US)

( * ) Notice: Subject to any disclaimer, the term of this patent is extended or adjusted under 35 U.S.C. 154(b) by 0 days.

(21) Appl. No.: 09/857,705

(22) PCT Filed: Dec. 9, 1999

(86) PCT No.: PCT/US99/29227

§ 371 (c)(1), (2), (4) Date: Aug. 27, 2001

(87) PCT Pub. No.: WO00/34194

PCT Pub. Date: Jun. 15, 2000

Related U.S. Application Data (60) Provisional application No. 60/111,544, filed on Dec. 9, 1998.

(51) Int. Cl.[7] .............................................. C03B 33/033
(52) U.S. Cl. .......................... 65/105; 65/174; 65/182.2; 83/880; 225/2; 225/95; 225/96.5
(58) Field of Search ............................. 65/25.1, 56, 105, 65/174, 182.2, 165; 83/880; 225/2, 94, 95, 96.5, 103

(56) References Cited

U.S. PATENT DOCUMENTS

| | | | | |
|---|---|---|---|---|
| 3,344,968 A | * | 10/1967 | Kovacik et al. | 225/2 |
| 3,875,766 A | * | 4/1975 | French | 65/112 |
| 4,948,025 A | * | 8/1990 | Lisec | 225/104 |
| 5,110,340 A | * | 5/1992 | Ikola et al. | 225/103 |
| 6,220,056 B1 | * | 4/2001 | Ostendarp | 406/88 |

* cited by examiner

*Primary Examiner*—Sean Vincent
(74) *Attorney, Agent, or Firm*—Webb, Ziesenheim Logsdon Orkin & Hanson, P.C.

(57) ABSTRACT

A process for cutting glass sheets (10) includes the steps of: scoring each glass sheet on an automatic scoring table (12) having a scoring head (14) moveable on a bridge (16) and a track (18); transporting each scored glass sheet to a breaking table (22) via conveyor (20); floating each scored sheet on a fluid medium on the breaking table; and impacting each scored sheet from above the floated scored sheet to fracture the scored sheet along the score lines (40 and 44). An apparatus for cutting glass sheets includes mechanisms for performing the steps of this process. The fluid medium may be air with the impacting performed by a vacuum workholder (26) consisting of an arm (30) raised and lowered by pneumatic cylinders (32), the arm supporting a plurality of vacuum cups (28) engaging the workpiece (42) for subsequent transportation.

20 Claims, 6 Drawing Sheets

PROCESS AND APPARATUS FOR BREAKING AND TRANSPORTING FLAT GLASS SHEETS

This application claims the benefit of Provisional application Ser. No. 60/111,544, filed Dec. 9, 1998.

BACKGROUND OF THE INVENTION

1. Field of the Invention

The present invention relates to the scoring of glass and frangible workpieces, and particularly, to improvements in breaking the workpieces along the score lines and transporting resulting products.

2. Background Information

Frangible workpieces, such as glass products, are often scored to obtain the desired shape of the final product. Scoring entails cutting a groove, called a score line, partially through the thickness of the workpiece with the score lines defining the general shape of the final product. The scoring is generally performed with a sharp metal cutting wheel. Following the placement of scoring lines, the product is separated from the remaining sections of the workpiece along the score lines in a process commonly called breaking. The breaking of the scored workpiece entails generating a fracture through the thickness of the frangible workpiece within the score line which propagates along the score line. For the sake of clarification, "breaking" within the context of this application refers to this fracturing along the score lines as opposed to the destruction of the workpiece. The breaking represents a critical step in defining the resulting edge of the product. Without a clean breaking procedure the product edge will not be sharp and well defined and may require a significant amount of subsequent processing, such as grinding. A poor break may also result in an unusable workpiece (here the workpiece may be considered "broken" in the generic sense of the word) resulting in yield loss in the overall process.

The scoring may be performed manually using hand-held scoring implements. For products made from large sheets, the process is commonly automated by scoring, also referred to as cutting, the large sheet or workpiece on an automated cutting table having a movable scoring or cutting head. In such automated cutting tables the movable cutting head is often controlled by a CNC controller to score the workpiece according to the desired pattern.

In current automated systems, the breaking of the scored workpiece along the score lines is problematic. Often the process if performed manually, prior to moving the product to subsequent processing. The manual breaking of the scored workpiece is labor intensive and time-consuming. Additionally, none of the existing processes, such as thermal breaking, pressure wheels, templates or the like, for breaking the scored workpiece provide a consistently clean break or product edge.

An object of the present invention is to overcome the aforementioned difficulty with the prior art and to provide a process and apparatus for efficiently and accurately breaking scored workpieces, such as glass sheets, and transporting the resulting products. A further object of the present invention is to provide a process and apparatus for breaking scored workpieces which provides a consistent clean break or edge to the product. A further object of the present invention is to provide an automatic breaking process and apparatus which is both easy and economical to manufacture and to use and is easy to install in existing processing lines.

SUMMARY OF THE INVENTION

The above objects are achieved by a process for breaking scored sheets according to the present invention. The process includes at least the steps of floating a scored sheet on a fluid medium and impacting the scored sheet from above the floated scored sheet. A process for cutting glass sheets according to the present invention includes the steps of: scoring each glass sheet on an automatic scoring table having a movable scoring head; transporting each scored glass sheet to a breaking table; floating each scored sheet on a fluid medium on the breaking table; and impacting each scored sheet from above the floated scored sheet to fracture the scored sheet along the score lines. One modification of the present invention may provide that the scoring and breakout are performed at the same station.

One embodiment of the present invention includes scoring the workpiece on a scoring table and including vent lines within selected sections of the workpiece. The impact of the scored workpiece moves the impacted locations of the workpiece at least halfway into the floated air cushion in less than 0.25 seconds. Additionally, the impact may be performed by vacuum cups engaging the final product at a single or plurality of locations. Air cylinders may be used for controlling the vertical movement of the vacuum cups. After breaking, the vacuum cups may be used to transport the product in a conventional fashion. A single or plurality of flat pads may be used in place of the vacuum cups. The vacuum cups are useful for subsequent transporting of the workpiece.

An apparatus according to the present invention includes at least a workpiece receiving, or breaking, table with a mechanism for floating a workpiece thereon on a fluid medium, and a workpiece impacting mechanism. The apparatus for cutting glass sheets according to the present invention includes: a mechanism for scoring each glass sheet, such as an automatic scoring table having a movable scoring head; a breaking table adjacent the automatic cutting table; a mechanism for transporting each scored glass sheet to the breaking table; a mechanism for floating each scored sheet on a fluid medium on the breaking table; and a mechanism for impacting each scored sheet from above the floated scored sheet to fracture the scored sheet along the score lines. A separate loading table and a separate table with a separate cutter for cutting score lines and/or vent lines may also be incorporated into the system for faster processing.

In one embodiment of the present invention the receiving table provides an air cushion for floating the glass at least 3/16 of an inch. The impacting mechanism may move the impacted locations of the workpiece at least halfway into the floated air cushion in less than 0.25 seconds, with the impact mechanism formed by vacuum cups which engage the product at a plurality of locations, and with air cylinders used for controlling the vertical movement of the vacuum cups. After breaking, the vacuum cups may be used to transport the product in a conventional fashion.

These and other advantages of the present invention will be clarified in the description of the preferred embodiments taken together with the attached drawings wherein like reference numerals represent like elements throughout.

BRIEF DESCRIPTION OF THE DRAWINGS

FIG. 4b is a schematic plan view of a portion of the apparatus shown in FIG. 4a;

FIG. 4c is a schematic plan view of an apparatus according to a third embodiment of the present invention;

DESCRIPTION OF THE PREFERRED EMBODIMENTS

Figure 1:
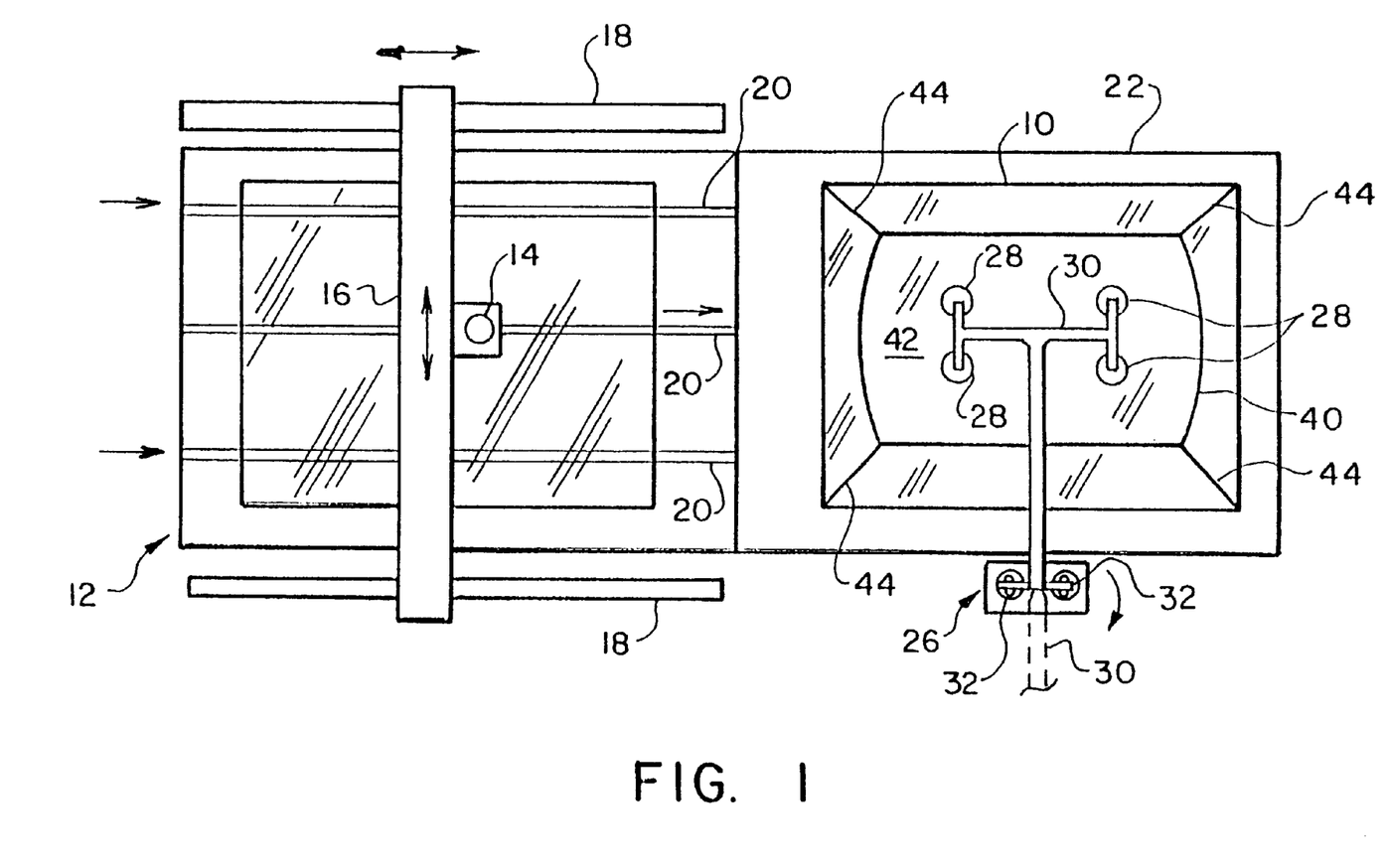
FIG. 1 schematically illustrates an apparatus according to one embodiment of the present invention.

FIG. 1 schematically illustrates an apparatus for cutting frangible workpieces, particularly glass sheets 10, also known as brackets in the automotive industry. However, the present invention is not limited to brackets or glass sheets 10 The apparatus includes a conventional automatic scoring table 12 which is also known as a glass cutting table. The scoring table 12 includes a movable scoring head 14. The scoring head 14 is mounted for movement along a bridge 16 extending across the scoring table 12. The bridge is mounted for movement along a track 18 extending the length of the scoring table 12. In this manner, the scoring head 14, the bridge 16 and the track 18 form an X-Y positioning system for moving the cutting element of the scoring head 14 across the sheet 10. The movements of the cutting head 14 are controlled by a CNC controller (not shown) to automate the process.

The scoring table 12 additionally includes a conventional conveyor 20 shown schematically in FIG. 1 for moving the sheet 12 onto and off of the scoring table 12. The conveyor 20 may be formed as a belt conveyor, as shown, or any conventional sheet conveying system. The scoring table 12 and the conveyor 20 are conventional elements known in the art and the specific construction of these elements does not form the details of the present invention. Examples of typical scoring tables are manufactured by Billco and others in the industry. Additionally, examples are found in U.S. Pat. No. 5,398,579 to Bando; U.S. Pat. No. 4,171,657 to Halberschmidt et al.; U.S. Pat. No. 4,709,483 to Hembree; U.S. Pat. No. 3,424,357 to Curtze et al.; U.S. Pat. No. 4,667,555 to Lisec and U.S. Pat. No. 3,151,794 to Brand, which are incorporated herein by reference.

A breaking table 22 is adjacent the scoring table 12 and is adapted to receive the sheet 10 therefrom by conveyor 20. The breaking table 22 is formed as an air table and is adapted to float each scored sheet 10 on a fluid medium, particularly air, above the breaking table 22. As schematically shown in FIG. 2b, the breaking table 22 includes a plurality of air ports 24 extending therethrough into an air channel 25 with the air ports 24 connected to a source (not shown) of pressurized fluid, particularly air. The air ports 24 may be ¼" holes at 4" to 6" spacing. Vent channels 23 are provided between air channels 25. Additionally, as shown in FIG. 3, the belt of conveyor 20 includes slots 29 therein to allow the air to flow through to support the sheet 10 on the belt. The vent channels 23 allow air to escape, either by an air pump or to atmosphere, such that the pressure is lower within vent channel 23 than between the belt of conveyor 20 and the sheet 10 such that the belt is held against the table top. The slots 29, rather than holes, improve the airflow through the belt to further help the sheet 10 to be floated rather than the belt.

The breaking table 22 additionally includes a movable vacuum work holder 26. The work holder 26 includes a series of vacuum chucks or cups 28 attached to an arm 30. The vacuum cups 28 are spaced from each other and adapted to engage the sheet 10 as described below. The vacuum cups 28 are controlled in a conventional manner, as known in the art. The arm 30 is preferably movable in a conventional fashion for transportation of a sheet 10 attached to the vacuum cups 28. The vacuum cups 28 are used to impact the scored sheet 10 which floats on the air cushion supplied by breaking table 22 to fracture the scored sheet along the score lines. Pneumatic cylinders 32 may be used to control the quick movement of the vacuum cups 28 and the arm 30 needs to quickly impact the glass sheet 10 to fracture the glass sheet 10 along the score lines. This will be further detailed in the following description of the process of cutting glass sheets 10 according to the present invention.

Figure 2A:
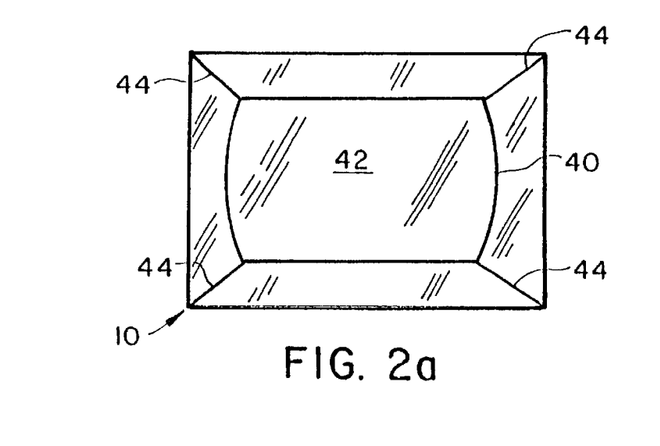
FIGS. 2a–2d schematically illustrate the process according to the present invention shown in FIG. 1.
Figure 2B:
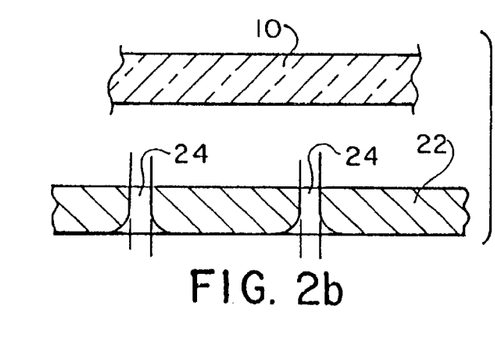
Figure 2C:
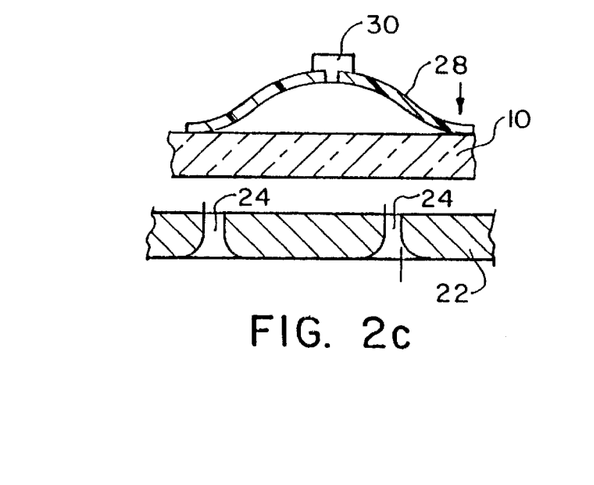

The process of cutting glass sheets 10 according to the present invention is schematically illustrated in FIGS. 2a–2d. FIG. 2a is a schematic plan view of a glass sheet 10 that has been scored on the scoring table 12. The glass sheet 10 includes a score line 40 around the periphery of a final product 42 which may be, for illustrative example, a windshield. Additionally, the glass sheet 10 includes vent lines 44 extending from selected portions of the score lines 40 to the periphery of the glass sheet 10. Each vent line 44 is also a score line, but unlike score line 40, each vent line 44 is not along the periphery of the product 42. During the breaking procedure, fractures through the glass sheet 10 propagate along the score line 40 and the vent lines 44. The vent lines 44 are provided to ensure a clean break along the score line 40 and the edge of the final product 42. Without the vent lines 44 at selected portions of the score line 40, the break along the score line 40 may be irregular or even incomplete. The specific number of vent lines 44 will depend upon the shape of the final product 42. However, with a conventional windshield shape, four vent lines 44 have been found to be sufficient. With regard to the positioning of the vent lines 44 during breakout, the cullet, or scrap pieces, each want to move outwardly away from the score line 40 in a straight line. The vent lines 44 are positioned to facilitate this straight line movement of each individual cullet piece.

Following the scoring of the glass sheet 10 as shown in FIG. 2a, the glass sheet is transported from the scoring table 12 to the breaking table 22 by conveyor 20. Stops (not shown) may be provided on the breaking table 22 for proper positioning of the glass sheet 10. Manual positioning or other known positioning methods may also be used. When the scored glass sheet 10 is received on the breaking table 22, the glass sheet 10 is floated on a fluid medium, specifically, an air cushion, through air ports 24 in breaking table 22, as shown in FIG. 2b. The height of the air cushion will depend on the size and grade of the glass sheet 10. However, an air cushion of at least 3/16 of an inch has been found to be sufficient for a single strength glass sheet 10. The thicker the air cushion, the greater the amount of pressure needed from the air ports 24 and air channels 25.

Figure 2D:
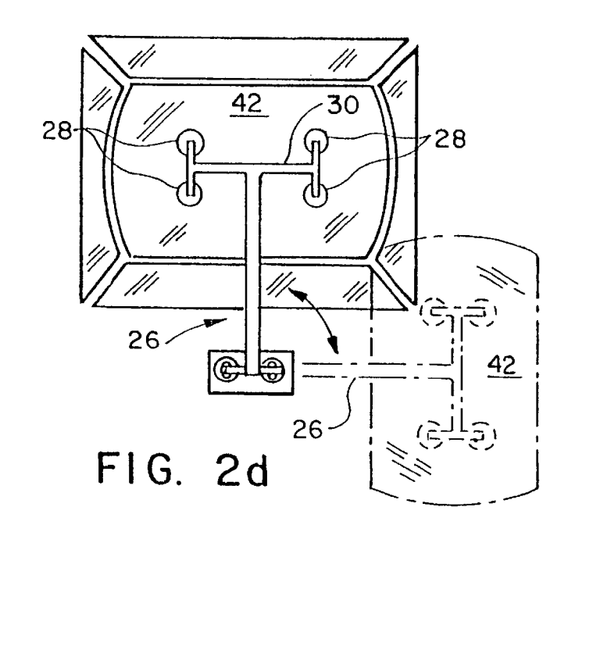
Figure 3:
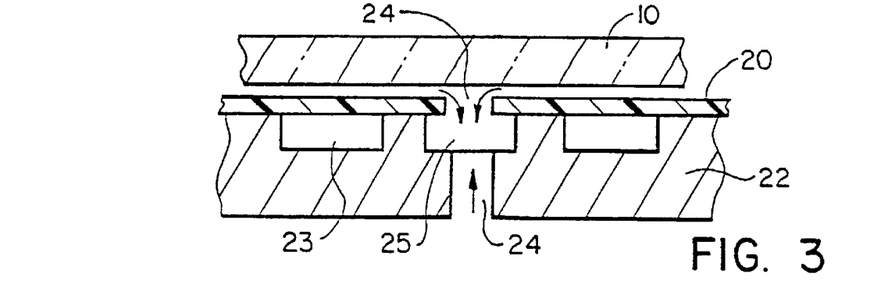
FIG. 3 schematically illustrates an air float table construction for the apparatus shown in FIG. 1.

Following the floating of the scored glass sheet 10 on the breaking table 22 and in the proper position, the pneumatic cylinders 32 are activated to impact the vacuum cups 28 against the glass sheet 10 in a rapid single stroke. Specifically, the vacuum cups 28 engage the glass sheet 10 and force the glass sheet 10 rapidly down generally at least one-half of the thickness of the air cushion in less than about 0.25 seconds. This rapid impact causes a fracture to propagate through the glass sheet 10 along the score line 40 and vent lines 44 to complete the breaking process. During this impacting, the vacuum cups 28 engage and attach to the final product 42 in a conventional fashion. The separation of the final product 42 from the remaining sections of the glass sheet 10 is schematically illustrated in FIG. 2d. As shown in FIG. 2d, the vacuum cups 28 are positioned on the arm 30 to engage only the final product 42 at a plurality of spaced locations. The use of a plurality of vacuum cups 28 to impact the glass sheet 10 has the advantage of distributing the forces over the area of the vacuum cups 28. Additionally, a single large vacuum cup may be used.

Following the breaking procedure, the final product 42 may be moved by arm 30 (as shown in phantom in FIG. 2d) to the next station for subsequent processing. After transportation of the final product 42, the remaining cullet pieces or scrap can be removed from the breaking table 22 and the process repeated for another glass sheet 10. The removal of the scrap from the breaking table 22 may be automated, such as a reciprocating sweep member (not shown), to guide the scrap to a recycle bin (not shown), or it may be manual. Additionally, the scoring table 12 may begin operation on the next glass sheet 10 as soon as the preceding glass sheet 10 is transported to the breaking table 22. A single conveyor may be provided to run through the entire system.

The apparatus and process of the present invention provide for efficient and accurate breaking of the scored glass sheets 10. Additionally, the present invention provides improved consistent breaks for the edge of the final product 42, minimizing the subsequent processing of the final product 42. The present system improves the speed of the current processes and automates subsequent transportation. The present invention is easy to operate, manufacture and install in existing processing lines.

Figure 4A:
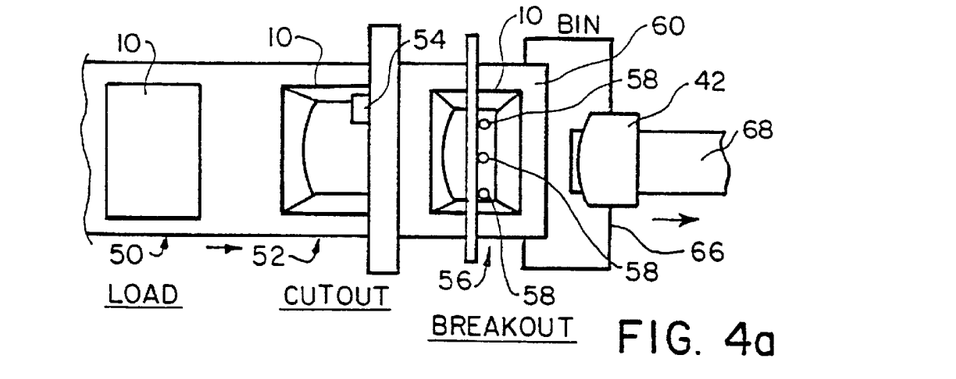
FIG. 4a is a schematic plan view of an apparatus according to a second embodiment of the present invention.
Figures 4B, 4C:
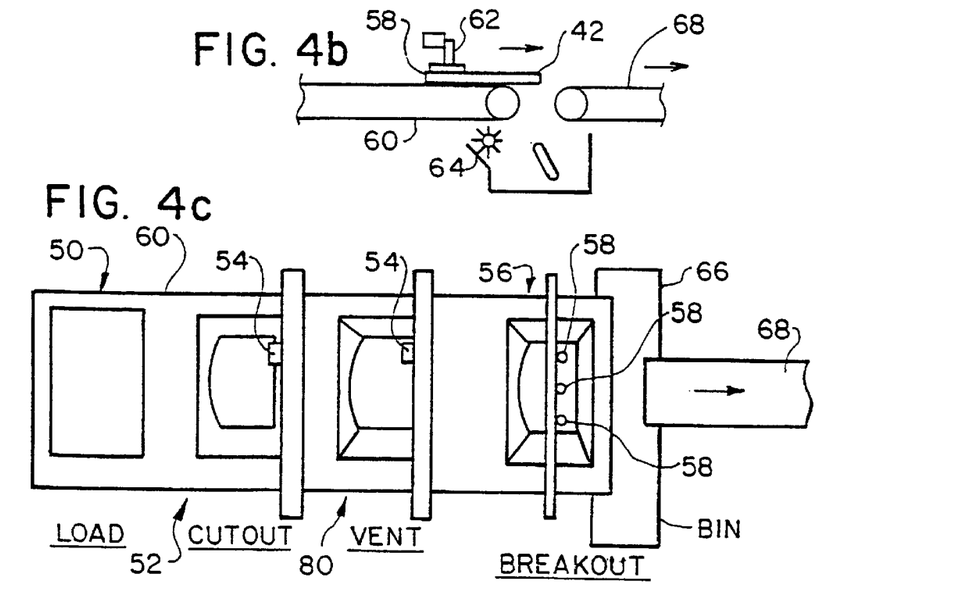
Figure 5:
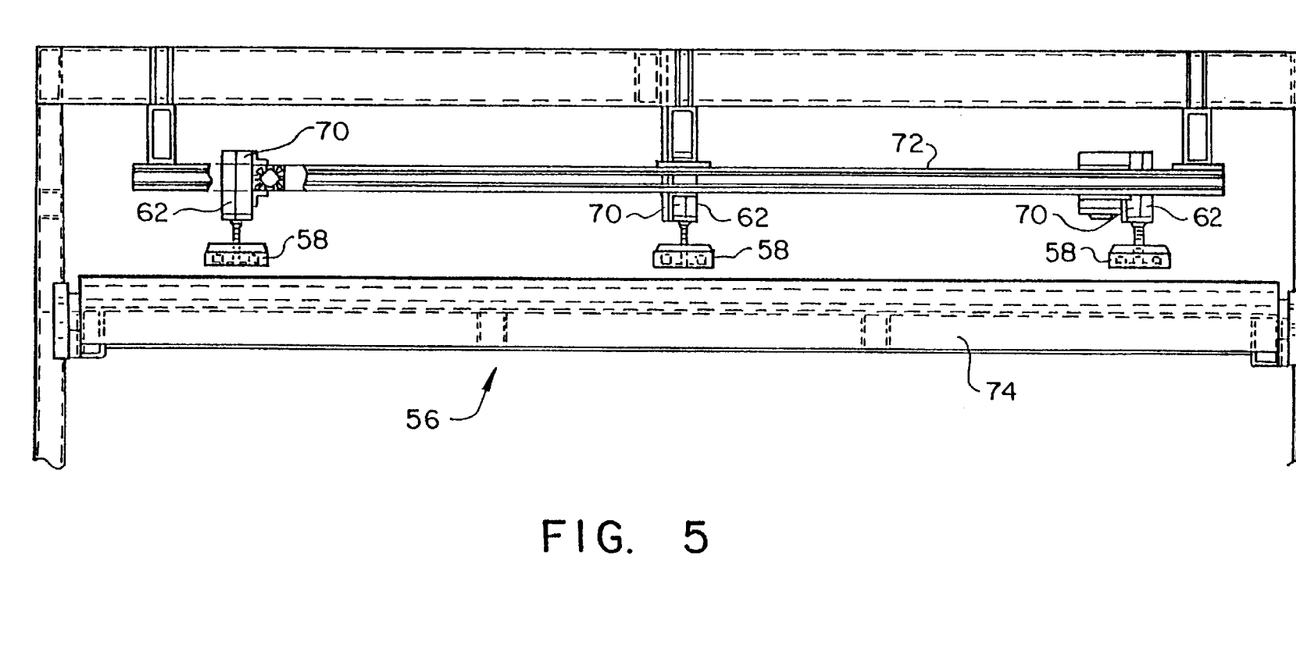
FIG. 5 is an end view of a portion of the apparatus shown in FIGS. 4a–4c.
Figure 6A:
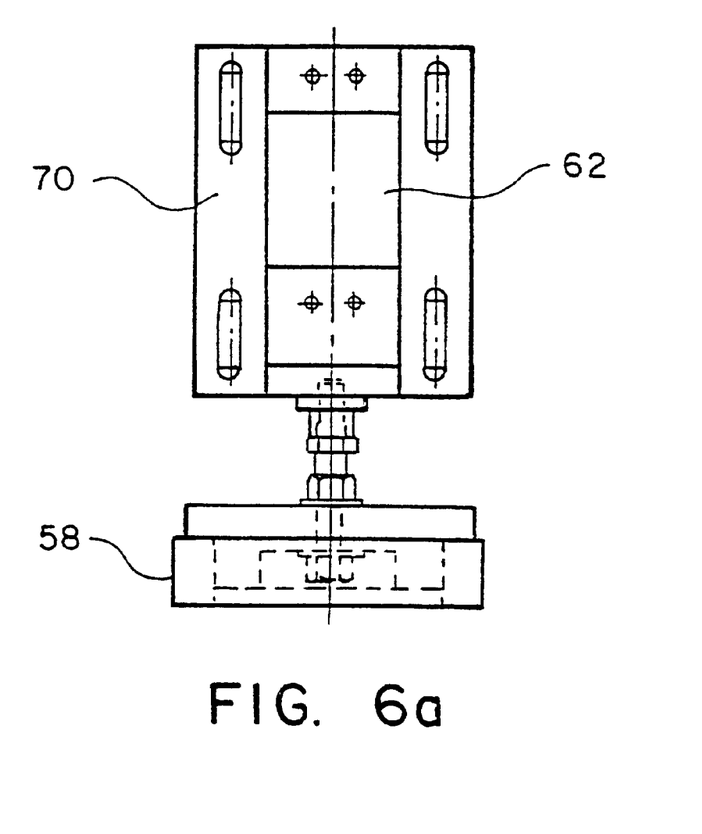
FIGS. 6a and 6b illustrate movable pads of the apparatus shown in FIGS. 4a–4c.
Figure 6B:
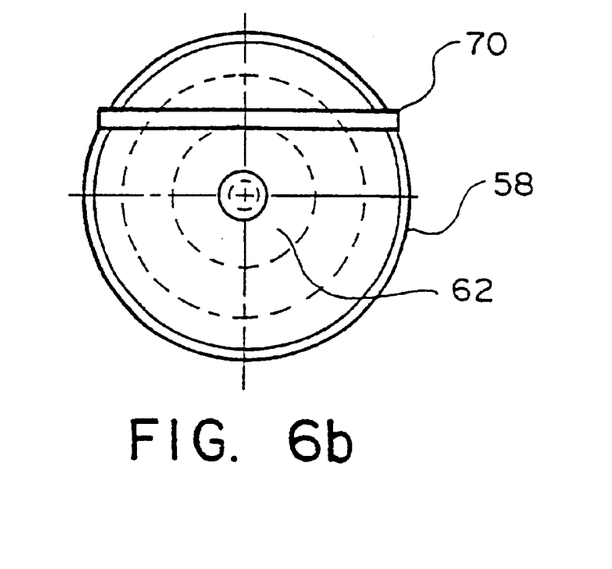
Figure 7:
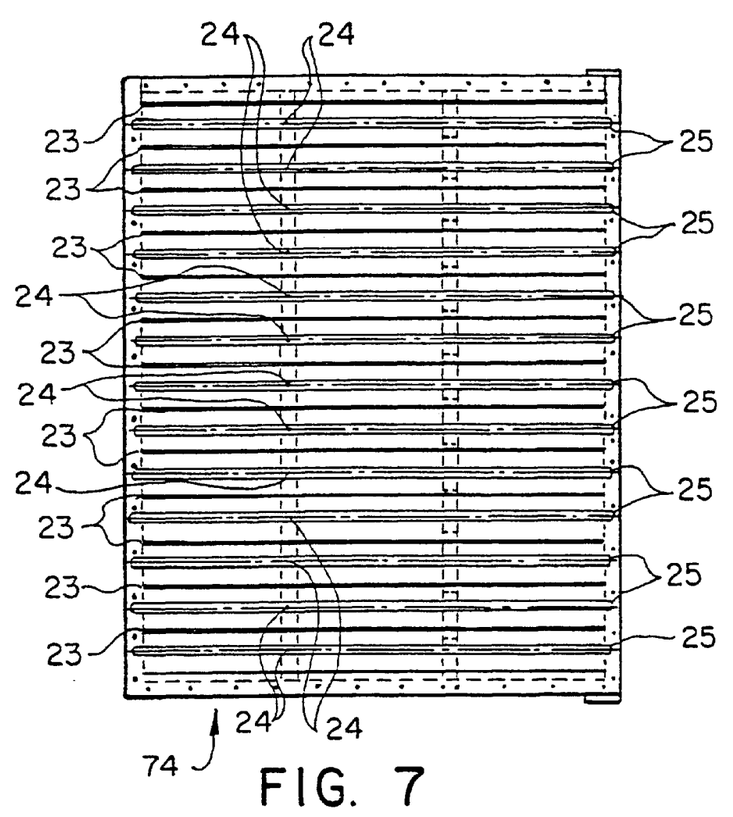
FIG. 7 is a plan view of an air float table of the apparatus in FIGS. 4a–4c.

FIGS. 4a and 4b schematically illustrate an apparatus for scoring and breaking out glass sheets 10 according to a second embodiment of the present invention. This system includes a loading station 50, a cutting or scoring station 52 with controllable cutter 54 and a breakout station 56 with a plurality of vertically movable pads 58. A wide slot type belt 60 extends through the loading station 50, scoring station 52 and breaking station 56. As shown in FIG. 4b, air cylinders 62 can control movement of the vertically movable pads 58 and a brush 64 can engage and clean the belt 60. Additionally, the system includes a cullet bin 66 and a subsequent conveyor 68 which is spaced from the belt 60 over the cullet bin 66 by a distance less than the final product as discussed below. FIGS. 5–7 show details of the breakout station 56. The pads 58 are attached to cylinders 62 which are secured to mounting bracket 70 for attachment to a frame 72 extending across the air float table 74 of breakout station 56. The brackets 70 allow for easy adjustment of pads 58 along the frame 72. FIG. 7 is a plan view of the air float table 74 showing the construction of air channels 25, air vents 23 and air ports 24.

In operation, the workpiece is loaded at the loading station 50 and moved to the scoring station 52 in which the appropriate score lines 40 and vents 44 will be placed on the glass sheet 10. The scored glass sheet 10 is then moved to the breakout station 56 which is constructed as an air table as discussed above in connection with breaking table 22. The vertically movable pads 58 are used to impact and break out the final product 42 in the same manner as vacuum cups 28 discussed above except that the pads 58 do not attach to the glass sheet 10 or final product 42. After breakout, the belt 60 is activated moving the cullet into the cullet bin 66. During this movement, the final product 42 will bridge the gap between the belt 60 and the conveyor 68 with the conveyor 68 transporting the final product to the subsequent processing. The movable pads 58 may be positioned to further prevent the final product from being directed towards the cullet bin 66. The system illustrated in FIGS. 4a and 4b is intended to illustrate the apparatus of the present invention which does not require vacuum chucks for operation. The use of vacuum chucks is preferred if after impacting the glass, the vacuum chucks pick the lite out of the cullet. Such that the cullet is allowed to more effectively float away from the lite. With the vacuum chucks, the lite may then be transferred to some other location as discussed above or lowered back into its original location. FIG. 4c schematically illustrates a layout similar to FIG. 4a except for the inclusion of a vent cutting station 80 which would include its own controllable cutter 54. The provision of a scoring station 52 and a vent cutting station 80 each with its own controllable cutter 54 is believed to improve the speed of the overall system.

Figure 8:
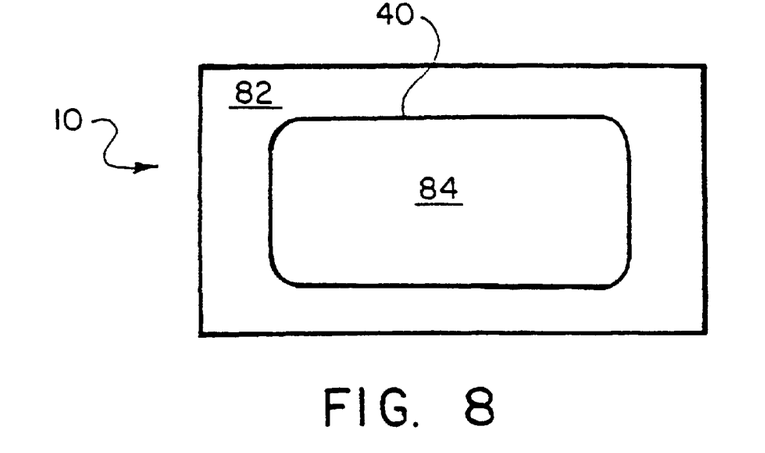
FIG. 8 schematically illustrates a glass workpiece configuration according to the present invention.

In the absence of vent lines 44, it is possible with appropriate scoring of the score line 40 to breakout an interior portion while remaining the entire exterior portion of the glass sheet intact. FIG. 8 schematically illustrates a glass sheet 10 with a score line 40 in which the outer portion remains intact after breakout and forms the final product 82 while the interior cullet 84 represents the scrap material. The interior cullet 84 may be removed by vacuum cups 28 or by falling into a cullet bin 66 in the manner described above. FIG. 8 is intended to illustrate the processing opportunities available with the system of the present invention.

The present invention is not intended to be limited by the specific examples discussed herein. Various modifications may be made to the present invention without departing from the spirit and scope thereof.

What is claimed is:

1. A process for breaking scored sheets comprising the steps of:
    floating a scored sheet on a fluid medium; and
    impacting the scored sheet from above the floated scored sheet to fracture the scored sheet along the scare lines.
2. The process of claim 1 wherein said fluid medium is air.
3. The process of claim 1 wherein said impacting includes engaging the scored sheet with vacuum cups.
4. The process of claim 3 further including the step of transporting the scored sheet by said vacuum cups after said impacting step.
5. The process of claim 2 wherein said vacuum cups engage a final product of the scored sheet at a plurality of spaced locations.
6. The process of claim 2 wherein said impacting is adapted to move the scored sheet at least halfway into the depth of said fluid medium in less than about 0.25 seconds.
7. A process for cutting glass sheets comprising the steps of:
    scoring each glass sheet on an automatic scoring table having a movable scoring head;
    transporting each scored glass sheet to a breaking table;
    floating each scored sheet on a fluid medium on said breaking table; and
    impacting each scored sheet from above the floated scored sheet to fracture the scored sheet along the score lines.
8. The process of claim 7 wherein said fluid medium is air.
9. The process of claim 8 wherein said impacting includes engaging a final product of each scored sheet with at least one vacuum cup.
10. The process of claim 9 further including the step of transporting the final product of each scored sheet by said at least one vacuum cup after said impacting step.

11. The process of claim 10 wherein said impacting includes engaging each scored sheet at a plurality of spaced locations.

12. The process of claim 11 wherein said impacting is adapted to move each scored sheet at least halfway into the depth of said air cushion in less than about 0.25 seconds.

13. The process of claim 12 wherein at least the vertical movement of said vacuum cups is controlled by pneumatic cylinders.

14. An apparatus for cutting glass sheets comprising:
- a means for scoring each glass sheet, said scoring means including an automatic scoring table having a movable scoring head;
- a breaking table downstream from said automatic cutting table;
- a means for transporting each scored glass sheet to said breaking table;
- means for floating each scored sheet on a fluid medium on said breaking table; and
- means for impacting each scored sheet from above the floated scored sheet to fracture the scored sheet along the score lines.

15. The apparatus of claim 14 wherein said impacting means includes vacuum cups adapted to engage each scored sheet.

16. The apparatus of claim 15 wherein said impacting means includes a means for transporting a final product of each scored sheet by said vacuum cups.

17. The apparatus of claim 16 wherein said vacuum cups engage the final product of each scored sheet at a plurality of spaced locations.

18. The apparatus of claim 17 wherein said impacting mechanism is adapted to move each scored sheet at least halfway into the depth of said fluid medium in less than about 0.25 seconds.

19. The apparatus of claim 18 wherein said impacting mechanism includes at least one vertically movable pad.

20. The apparatus of claim 14 further including a cullet bin which automatically receives the cullet as the workpiece is advanced beyond the breaking table.

* * * * *